United States Patent
Rokhlenko et al.

(10) Patent No.: US 9,684,908 B2
(45) Date of Patent: Jun. 20, 2017

(54) AUTOMATICALLY GENERATED COMPARISON POLLS

(71) Applicant: Yahoo!, Inc., Sunnyvale, CA (US)

(72) Inventors: Oleg Rokhlenko, Haifa (IL); Idan Szpektor, Kfar Saba (IL)

(73) Assignee: YAHOO!, INC., Sunnyvale, CA (US)

(*) Notice: Subject to any disclaimer, the term of this patent is extended or adjusted under 35 U.S.C. 154(b) by 288 days.

(21) Appl. No.: 14/449,390

(22) Filed: Aug. 1, 2014

(65) Prior Publication Data
US 2016/0034585 A1 Feb. 4, 2016

(51) Int. Cl.
G06F 17/30 (2006.01)
G06F 7/00 (2006.01)
G06Q 30/02 (2012.01)

(52) U.S. Cl.
CPC .................................. G06Q 30/02 (2013.01)

(58) Field of Classification Search
CPC .......... G06F 17/30867; G06F 17/3053; G06Q 30/02
USPC ........................................................ 707/769
See application file for complete search history.

(56) References Cited

U.S. PATENT DOCUMENTS

| | | | | |
|---|---|---|---|---|
| 8,060,390 B1* | 11/2011 | Overstreet | ............. | G06Q 10/06 705/7.11 |
| 8,478,769 B2 | 7/2013 | Goldfarb | | |
| 2003/0120511 A1* | 6/2003 | Legnini | ................. | G06Q 30/02 705/2 |
| 2003/0144899 A1* | 7/2003 | Kokubo | ................ | G06Q 30/02 705/7.32 |
| 2003/0172067 A1* | 9/2003 | Adar | ..................... | G06Q 30/02 707/999.007 |
| 2009/0037248 A1* | 2/2009 | Sholtis | ............... | G06Q 30/0203 705/7.32 |
| 2013/0252221 A1 | 9/2013 | McNutt et al. | | |
| 2015/0178392 A1* | 6/2015 | Jockisch | ........... | G06F 17/30867 707/706 |
| 2015/0244829 A1* | 8/2015 | Ethington | ............. | H04L 67/306 715/753 |

\* cited by examiner

*Primary Examiner* — Pavan Mamillapalli
(74) *Attorney, Agent, or Firm* — Cooper Legal Group, LLC

(57) ABSTRACT

A content item presented to a user may involve two or more topics, such as news articles mentioning athletes or actors. Users may enjoy expressing opinions about a comparison of the topics, such as personal preferences or an evaluation of talent. Presented herein are techniques for automatically generating, for the content item, a poll among the topics of the content item. The respective comparisons of a comparison set are evaluated for the topics of the content item, and a comparison relevance score is computed identifying the relevance of the comparison of the topics. The comparison having the highest relevance for the topics is selected, and a comparison question is formulated and presented to the user with the content item. Results may be tabulated and presented for the topics of the content item. These techniques facilitate user expression about the content item without depending upon user-authored polls for each content item.

20 Claims, 11 Drawing Sheets

AUTOMATICALLY GENERATED COMPARISON POLLS

BACKGROUND

Within the field of computing, many scenarios involve the presentation by a device of a content item, such as news articles, movie reviews, a product category review, or an image. Users who view the content item on the device may wish to express opinions about topics included in the content item. In particular, the users may enjoy expressing a relative comparison among two or more topics of the content item, such as their preferences among a pair of actors or musical performers, or their assessment of the relative skill of a set of athletes in a particular sport. An author of the content item may therefore write a comparison poll of the topics, which may be presented to the users, e.g., as a multiple-choice list asking the user to select their "favorite" actor or the "best" athlete. The device may collect responses from users, tabulate them for presentation to other users (e.g., as users' preferences among the topics of the content item), and send feedback to the users.

SUMMARY

Although the presentation of comparison polls may be appealing to users, the preparation of such polls by authors may entail a significant resource cost. These resource costs escalate to significant and potentially prohibitive levels when applied to a large body of content items. In some scenarios, the authors of the content items may not be available to prepare a comparison poll, such as for a historical content item set, or a content item set that is retrieved from other content sources, such as content services provided through the internet. Such author-driven processes may therefore limit the scalability of the solution when applied to larger bodies of content items. Additionally, allocating the responsibility of preparing such comparison polls to a variety of authors may result in inconsistencies among such generated comparison polls, such as in the style, focus, and language expressing such comparison polls. As yet another example, it may be desirable to present new or newly retrieved content items to users as quickly as possible, and asking an author to generate a comparison poll may impose a significant delay between receiving the content item and presenting the content item to users.

Presented herein are techniques for generating comparison polls in an automated manner. As one example of the techniques presented herein, a content service may evaluate a content item to identify topics presented therein (e.g., the names of actors presented in a news article about a movie; the faces of athletes presented in an image; the names of movies and books in a list of works to be published in the near future; and the names of places presented in a travel guide). The content service may evaluate the topics of the content item against a set of comparisons, such as "is (topic 1) or (topic 2) a better actor?", "would you rather visit (topic 1) or (topic 2)?", or "are you more excited about (topic 1) or (topic 2)?", and may calculate a comparison relevance score indicating the relevance of the comparison for the topics of the content item, which may be calculated, e.g., in view of the context and/or content of the content item. The content service may then apply the comparison to the topics of the content item to generate a comparison question, which may be presented to the user with the content item. In some variations, the content service may collect user responses to the content poll, e.g., in order to rank users' responses to a variety of topics, such as users' favorite actors, and/or to present additional comparison polls to the same user. These and other variations may be included in embodiments of the techniques presented herein.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted as limiting any aspect of the invention, which is defined by the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and systems. Accordingly, this subject matter is not intended to be construed as limited to any example embodiments set forth herein; example embodiments are provided merely to be illustrative. Such embodiments may, for example, take the form of hardware, software, firmware or any combination thereof (other than software per se). A reasonably broad scope for claimed or covered subject matter is intended.

1. Computing Scenario

The following disclosure provides a discussion of some types of computing scenarios in which the presently disclosed techniques may be utilized.

1.1. Networking

Figure 1:
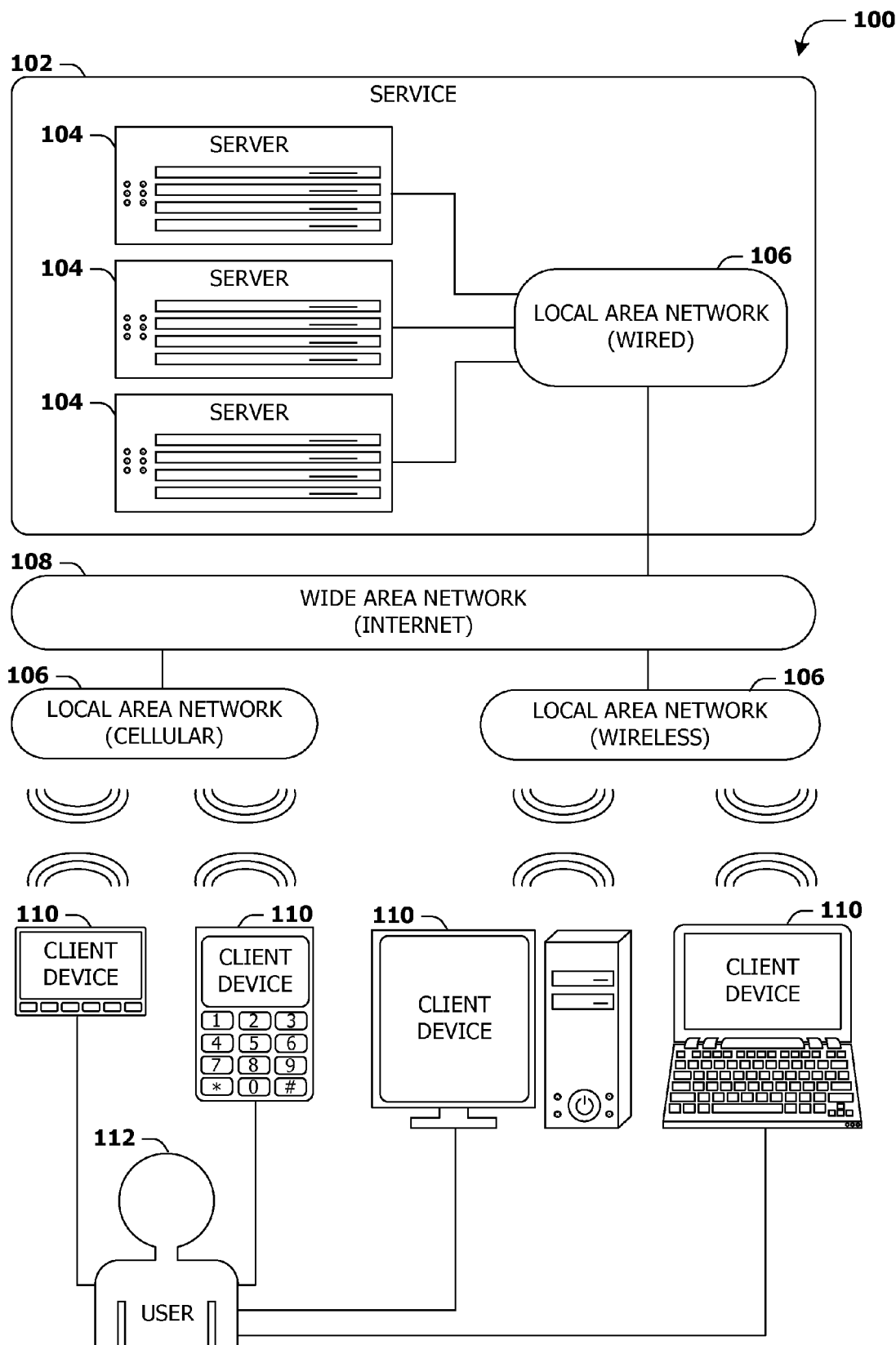
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may also be interconnected directly, or through one or more other networking devices, such as routers, switches, and repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may also include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and mesh architectures, and/or also a variety of roles, such as administrative servers, authentication servers, security monitor servers, data stores for objects such as files and databases, business logic servers, time synchronization servers, and front-end servers providing a user-facing interface to the service 102.

Likewise, a local area network 106 may comprise one or more sub-networks, such as may employ differing architectures or may be compliant or compatible with differing protocols, may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and client devices 110. The wide area network 108 may encompass various combinations of devices with varying levels of distribution and exposure, such as a public wide-area network (e.g., the Internet), or a private network (e.g., a virtual private network (VPN) of a distributed enterprise).

In the scenario 100 of FIG. 1, the service 102 may be accessed via the wide area network 108 by a user 112 of a set of client devices 110, such as a portable media player (e.g., an electronic text reader, an audio device, or a portable gaming, exercise, or navigation device); a portable communication device (e.g., a camera, a phone, or a text chatting device); a workstation; and a laptop form factor computer. The respective client devices 110 may communicate with the service 102 via various connections to the wide area network 108. As a first such example, one or more client devices 110 may comprise a cellular communicator, and may connect to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
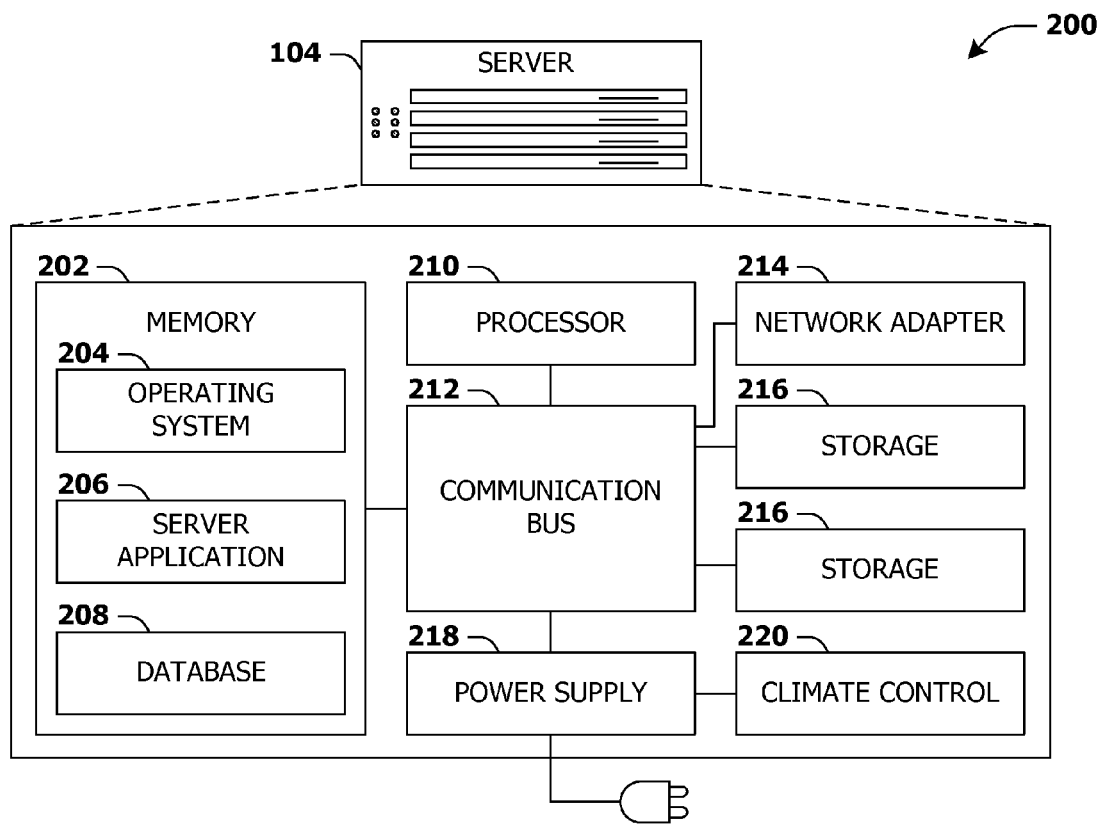
FIG. 2 is an illustration of a scenario involving an example configuration of a server that may utilize at least a portion of the techniques presented herein.

FIG. 2 presents a schematic architecture diagram 200 of a server 104 that may utilize at least a portion of the techniques provided herein. Such servers 104 may vary widely in configuration or capabilities, alone or in conjunction with other servers 104, in order to provide a service 102.

A server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A server 104 may also comprise a memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may also comprise a variety of peripheral components, such as a wired and/or wireless network adapter 214 connectable to a local area network 106 and/or wide area network 108; one or more storage components 216, such as a hard disk drive, a solid-state storage device (SSD), a flash memory device, and/or a magnetic and/or optical disk reader. The server 104 may also comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. In a multibus scenario, a communication bus 212 may interconnect the server 104 with at least one other server 104. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

A server 104 may also operate in various physical enclosures, such as a desktop or tower, and/or may be integrated with a display as an "all-in-one" device. A server 104 may also be mounted horizontally and/or in a cabinet or rack, and/or may simply comprise an interconnected set of components. A server 104 may also comprise a dedicated and/or shared power supply 218 that supplies and regulates power for the other components. The server 104 may also provide power to and/or receive power from another server 104 and/or other devices. The server 104 may also comprise a shared and/or dedicated climate control unit 220 that regulates climate properties, such as temperature, humidity, and airflow. Many such servers 104 may be configured and/or adapted to utilize at least a portion of the techniques presented herein.

1.3. Client Device Configuration

Figure 3:
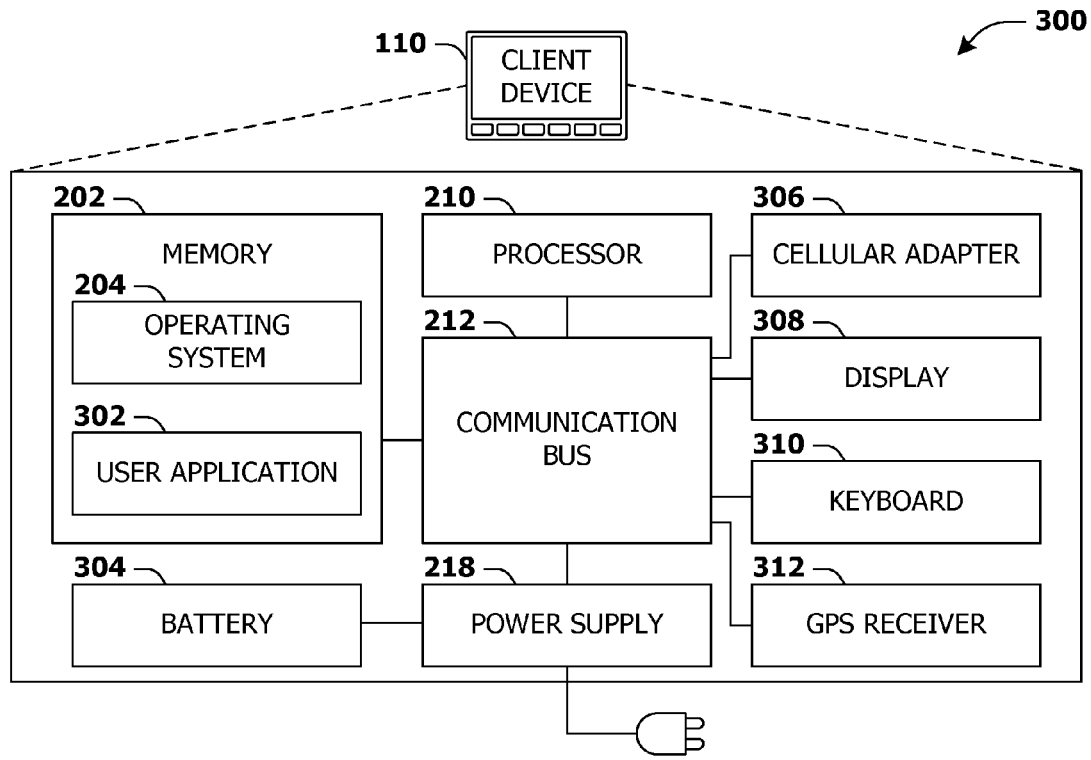
FIG. 3 is an illustration of a scenario involving an example configuration of a client that may utilize at least a portion of the techniques presented herein.

FIG. 3 presents an schematic architecture diagram 300 of a client device 110 operable by a user 112, whereupon at least a portion of the techniques presented herein may be implemented. Such client devices 110 may vary widely in configuration or capabilities, in order to provide a variety of functionality to the user 112. A client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and a component of a piece of furniture, such as a tabletop, and/or of another device, such as a vehicle or residence. A client device 110 may also serve the user 112 in a variety of roles, such as a workstation, kiosk, media player, gaming device, and/or appliance.

A client device 110 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A client device 110 may also comprise a memory 202 storing various forms of applications, such as an operating system 204; one or more user applications 302, such as document applications, media applications, file and data access applications, communication applications such as web browsers and email clients, utilities, and games; and drivers for various peripherals. A client device 110 may also comprise a variety of peripheral components, such as a wired and/or wireless network adapter 214 connectable to a local area network 106 and/or wide area network 108; one or more output components, such as a display 308 coupled with a display adapter (optionally including a graphical processing unit (GPU)), a sound adapter coupled with a speaker, and a printer; input devices for receiving input from the user 112, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, and/or an compass, accelerometer, and/or gyroscope that detects a physical orientation of the client device 110. Other components that may optionally be included with the client device 110 (though not shown in the schematic diagram 300 of FIG. 3) include one or more storage components 216, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

A client device 110 may also comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. A client device 110 may also comprise a dedicated and/or shared power supply 218 that supplies and regulates power for the other components, and/or a battery 304 that stores power for use while the client device 110 is not connected to a power source via the power supply 218. The client device 110 may also provide power to and/or receive power from other client devices 110.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user 112 via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may also include one or more servers that may locally serve the client device 110 and/or other client devices 110 of the user 112 and other individuals. For example, a locally installed webserver may provide web content in response to locally submitted web requests. Many such client devices 110 may be configured and/or adapted to utilize at least a portion of the techniques presented herein.

1.4. Content Services and Content Providers

Figure 4:
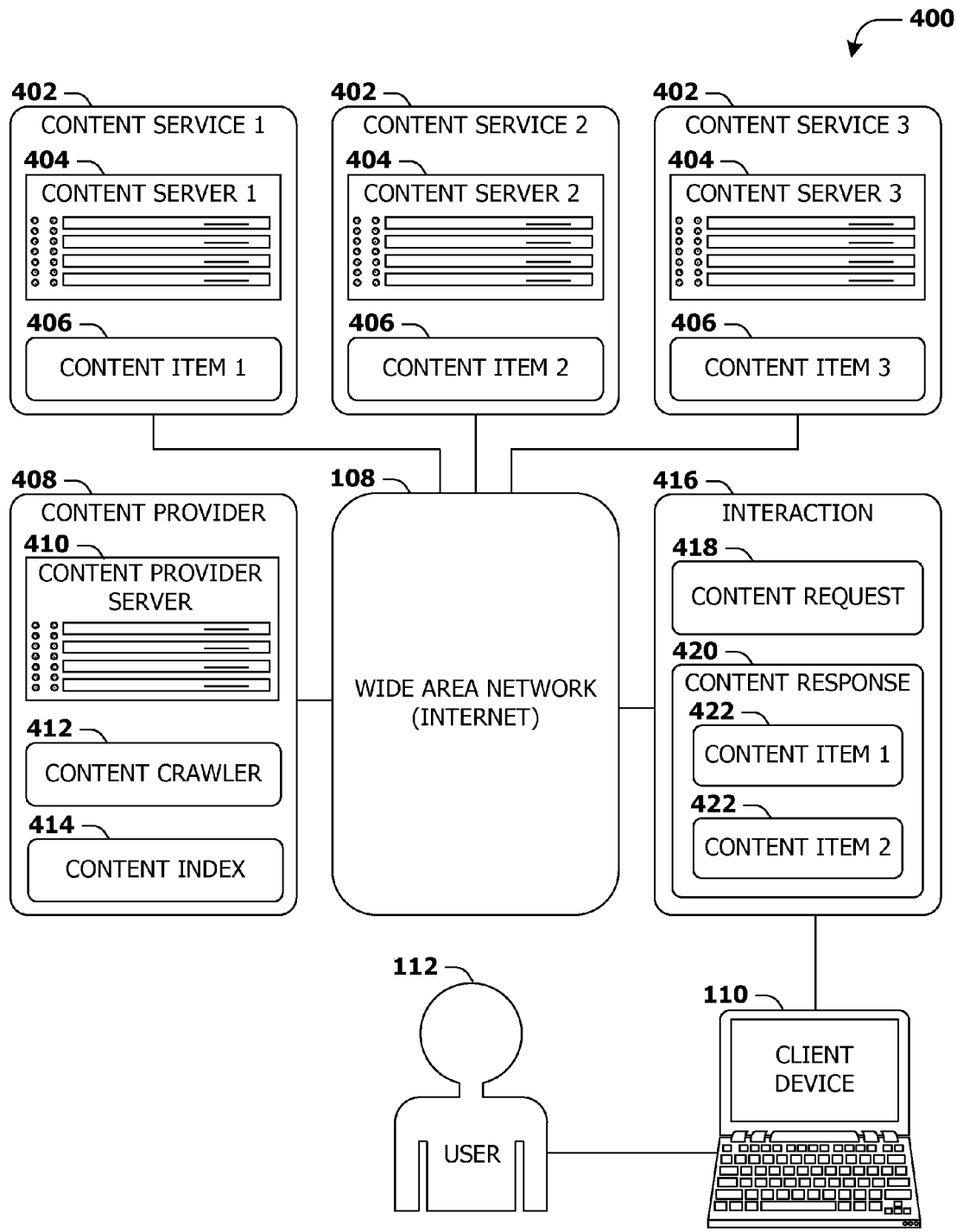
FIG. 4 is an illustration of a scenario involving an example content provider that may utilize at least a portion of the techniques presented herein.

FIG. 4 is an interaction diagram of a scenario 400 featuring a content provider 408 that provides a set of content items 406 to a user 112. In this scenario 400, a set of content services 402 respectively comprise a content server 404 that provides access to a set of content items 406, such as text articles, pictures, video, audio, applications, data files, and output from devices such as cameras. A content provider 408 is provided, comprising a content provider server 410 that interacts with the content services 402 over a wide area network 108, such as the Internet, to index the content items 406 provided thereby. For example, the content provider server 410 may utilize a content crawler 412 that iteratively explores the content services 402 and generates a content index 414. The content provider 408 may be deployed in a distributed manner across at least two content provider servers 410, which may be organized by role (e.g., a first content provider server 410 maintaining the content index 414, and a content provider server 410 interacting with users 112 and/or client devices 110) and/or geographically (e.g., various content provider servers 410 may be provided to service client devices 110 in different physical locations). Components may be duplicated within the content provider 408; e.g., two or more content provider servers 410 may be provided to facilitate the reliability, response time, and/or scalability of the content provider 408.

As further illustrated in the scenario 400 of FIG. 4, a user 112 of a client device 110 may engage in an interaction 416 with the content provider 408 and/or content services 402 in the following manner. For example, the client device 110 may present the content index 414 to the user 112, e.g., as a set of categories of topics that may be of interest to the user 112, such as articles about news stories, movies, music, or books. The user 112 may, through the client device 110, initiate a content request 418, such as a selection of a category from the content index 414. The content provider 408 may examine the content index 414 to select content items 406 responsive to the content request 418, and may generate a content response 420 including the selected content items 422 for presentation to the user 112. The content provider 408 may also utilize other techniques and/or components, such as an index storage component, a search component, a ranking component, a cache, a profile storage component, a logon component, a profile builder, and one or more application program interfaces (APIs). Many such content providers 408 may be provided, and may variously utilize the techniques presented herein.

In techniques such as those presented herein, content providers 408 may provide content stored by the same content provider 408 (e.g., a content provider 408 for a locally stored file system, database, or content library); for content stored by other content services 402; and/or for content stored by one or more client devices 110 (e.g., a cloud indexing service that indicates the availability of data objects on a distributed set of client devices 110 of the user 112). Additionally, such content providers 408 may provide a variety of content, including messages generated by and/or sent to the user 112; text articles; fiction and/or nonfiction stories; facts about topics such as individuals, companies, place; pictures; audio and video recordings; applications; data objects such as files and databases; and products or services.

Content providers 408 may receive and process content requests 418 specified in a variety of modalities, including text, handwriting, speech, verbal cues or keywords, gestures, and body language. The content requests 418 may also be specified in a variety of organizational formats, such as a group of keywords, a Boolean logical structure or expression tree, or a natural-language speech. Additionally, the content provider 408 may select content items 406 that are responsive to the content request 418 in various ways, such as a hyperlink to a uniform resource identifier (URI) of the content item 406; a description of the content item 406, such as the title, file type, generation date, synopsis, and/or preview version of the content item 406; and/or a copy of the full content item 406. The content response 420 may also be presented to the user 112 in many ways, such as in the same presentation as a search interface (e.g., presented in the same web page as the search interface, as in above, below, aside, or in place of the search interface); in a second presentation that is distinct from but related to the search interface (e.g., presented in a second web page or popup window); and/or in a second presentation that is unrelated to the search interface, such as a separate application (e.g., receiving a content request 418 through a web browser and presenting the content response 420 in a second application) and/or a different modality as the search interface (e.g., receiving a content request 418 provided in a web page, and presenting to the user 112 an audially presented set of content items 422).

Figure 5:
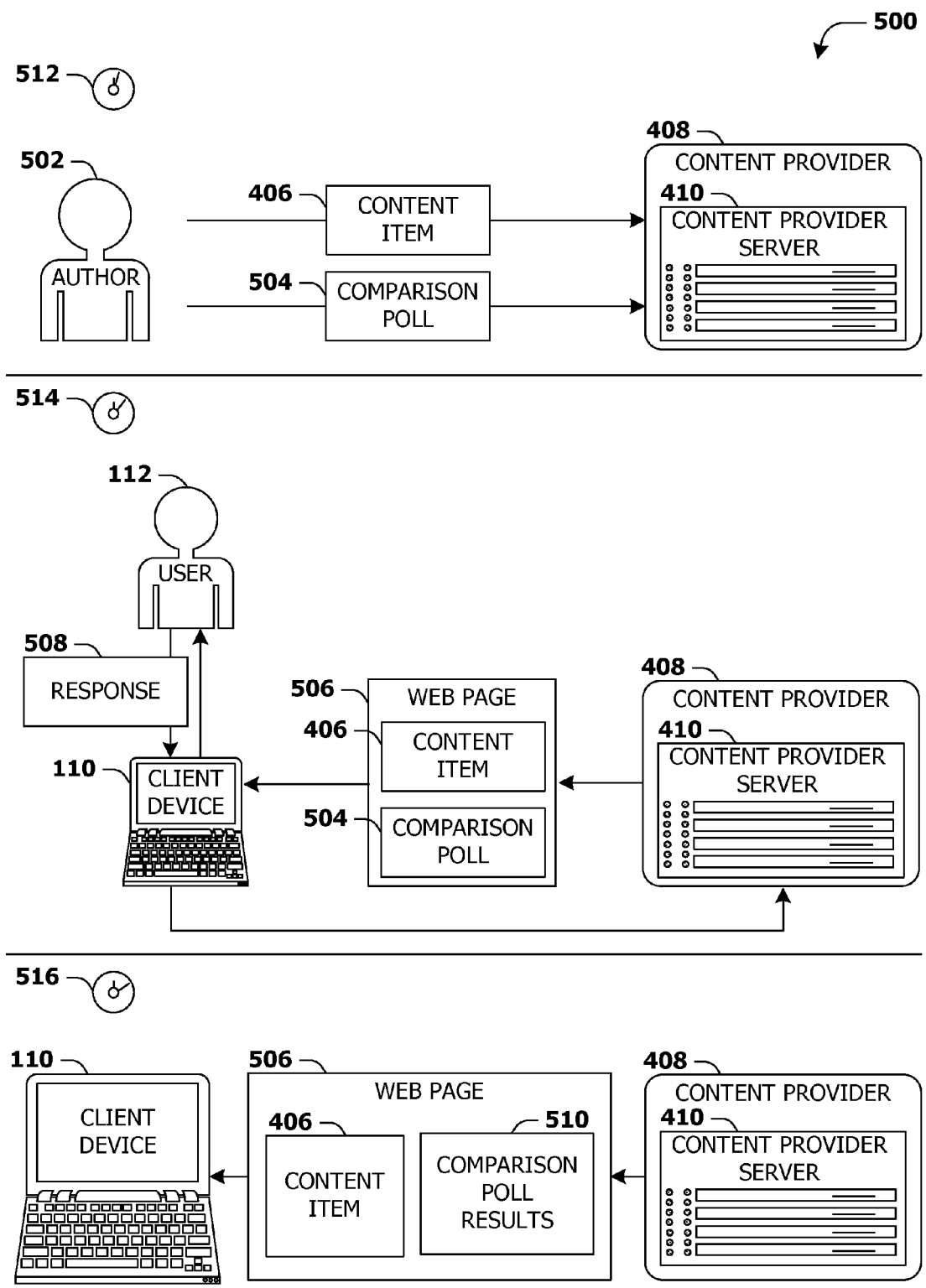
FIG. 5 is an illustration of a scenario featuring an example interaction of a user with a content provider.

FIG. 5 is an interaction diagram of a scenario 500 involving one such interaction 416 of the user 112 with the content provider 408. In this scenario 500, at a first time 512, an author 502 submits a content item 406 to the content provider 408 for storage by the content provider server 410. However, it may be recognized that users 112 who view such content items 406 enjoy expressing opinions about the content of such content items 406. Accordingly, the author 502 of the content item 406 may also submit to the content provider 408 a comparison poll 504, such as whether the user 112 agrees with or disagrees with opinions expressed in the content item 406, or the preferences of the user 112 for the topics of the content item 406. The content provider server 410 may store the comparison poll 504 in association with the content item 406.

At a second time 514, a user 112 may initiate a content request 418 for content items 406, and the content provider 408 may generate a web page 506 comprising a set of content items 406, as well as the comparison poll 504 authored by the author 502. The client device 110 of the user 112 may present the web page 506 to the user 112, along with the comparison poll 504, e.g., presented as a set of checkboxes or radio buttons that allow the user 112 to specify a comparison response 508. If the user 112 submits a comparison response 508 to the comparison poll 504, the client device 110 may submit the comparison response 508 to the content provider server 410, which may collect such comparison responses 508 from a variety of users 112.

At a third time 516, in a presentation of the same content item 406 or a different content item 406 in a web page 506, the search service 408 may include a comparison poll result 510, such as the aggregate response of users 112 to the comparison poll 504. In this manner, the presentation of the comparison poll 504 may facilitate the interest and engagement of the user 112 in the content item 406 and other content provided by the content provider 408.

2. Presented Techniques

Presented herein are techniques for automatically generating comparison polls 504 based on content items 406. Variations of such techniques may enable the generation of comparison polls 504 that provide relevant and semantically coherent comparisons among the topics of a content item 406, and/or that are contextually related to the content item 406.

Figure 6:
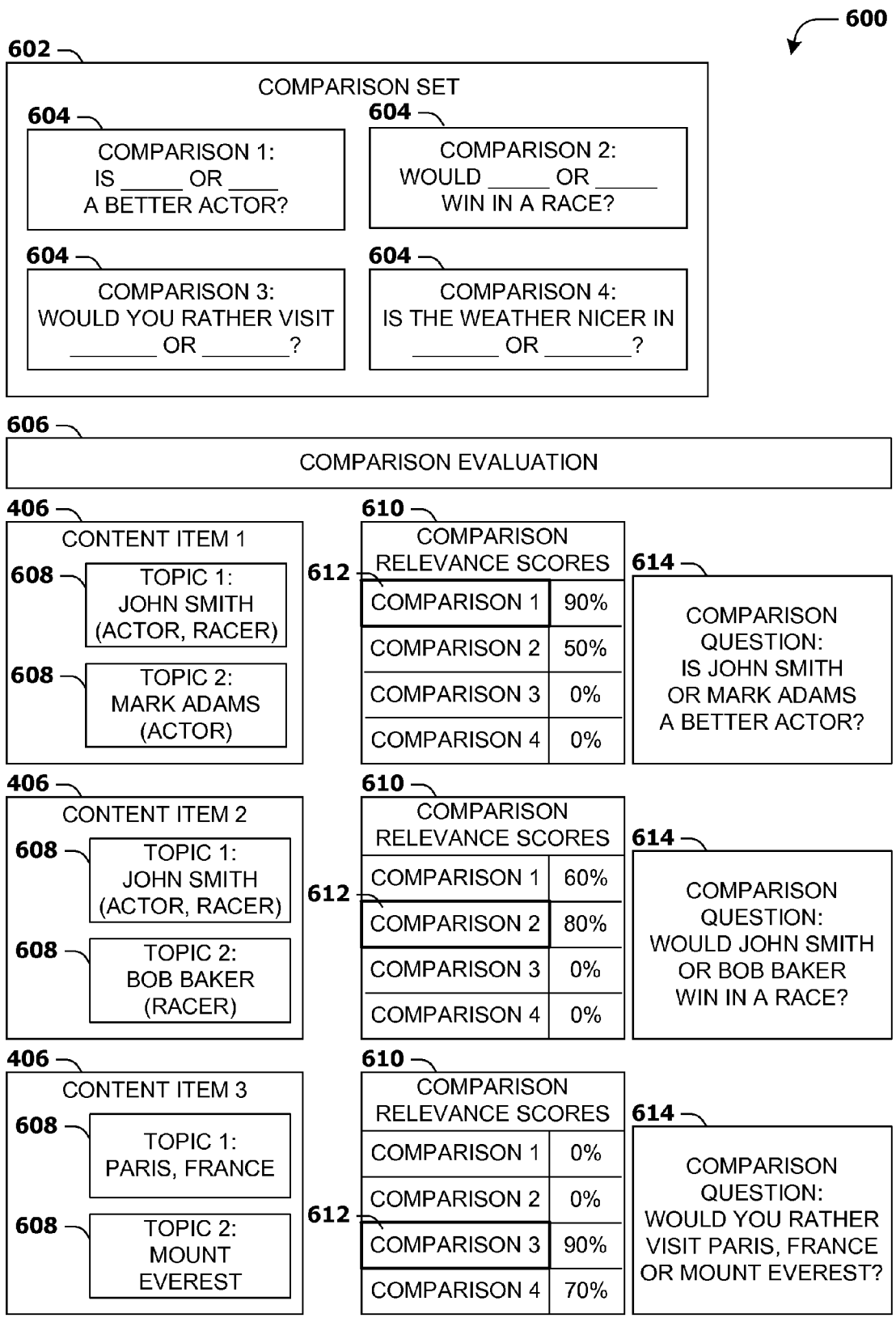
FIG. 6 is an illustration of a scenario featuring an example interaction of a user with a content provider in accordance with the techniques presented herein.

FIG. 6 is an illustration of a scenario 600 featuring a technique for enabling a content provider 408 to generate comparison polls 504 for various content items 406. A comparison set 602 is generated, involving a set of comparisons among two (and in some cases, more than two) topics 608. For a particular set of content items 406, the topics 608 in each content item 406 are identified. Then, for each content item 406, a comparison evaluation 606 is performed between each comparison 604 of the comparison set 602 and the topics 608 of the content item 406. The comparison evaluation 606 results in the calculation of a comparison relevance score 610 indicating the relevance of the comparison 604 to the topics 608 of the content item 406. A comparison 604 is selected that has a high comparison relevance score 610 among the comparison set 602 for the content item 406, and is used to generate a comparison question 614 that compares the topics 608 of the content item 406.

For example, a first content item 406 presented in the example scenario 600 of FIG. 6 involves two topics 608, i.e., the names of two actors who may appear together in a film.

Each comparison 604 in the comparison set 602 is examined to determine whether the topics 608 may be suitably compared in this manner (e.g., which individual is a better actor; which individual the user 112 would win in a race; and which individual has nicer weather). The latter comparison 604 is excluded as irrelevant, and the former two comparisons 604 are further evaluated; e.g., the first individual may also be known as an amateur racer, but the second individual may not. Accordingly, the first comparison 604 having the highest comparison relevance score 610 is identified as a selected comparison 612, and the topics 608 are inserted into the selected comparison 612 (e.g., into slots in a comparison question template) to generate a comparison question 614 for the content item 406. The comparison question 614 may then be presented to one or more users 112 with the content item 406, and the comparison responses 508 of the one or more users 112 may be collected and utilized in a variety of ways. In this manner, the techniques presented herein enable an automated generation of a comparison question 614 to accompany a content item 406 with contextual relevance to the topics 608 of the content item 406.

3. Technical Effect

The techniques presented herein and illustrated in the scenario 600 of FIG. 6 may provide a variety of technical effects for the client device 110 and/or the content provider 410.

As a first technical effect, an automated generation of comparison polls 504 may facilitate the efficiency of the content provider 408. As a first such example, a content provider 408 may index a large number of content items 406 stored by the content provider server 410 and/or other content services 402, such that storing a comparison poll 504 generated by the author 504 for every content item 406 may consume a large amount of storage space. Moreover, many such comparison polls 504 may be redundant; e.g., a large number of content items 406 may involve pairs of actors, and storing a large number of accompanying comparison poll 504 asking: "Who is the better actor . . . " may be highly redundant and inefficient. As a second such example, a content provider 408 may receive and/or provide content items 406 in a "live" manner, for rapid deployment to users 112 (e.g., where the content provider 408 syndicates content items 406), and waiting for an author 502 to generate a comparison poll 504 for the content item 406 may significantly delay the distribution of such "live" content items 406 to users 112. In such scenarios, automatically generating a comparison poll 504 when a user 112 requests the content item 406 may provide a significant efficiency advantage over retrieving a previously stored comparison poll 504. Such efficiency gains may reduce the infrastructure costs of the content provider 408 (e.g., reducing the amount of storage utilized by the content provider server 41); may enhance the user experience of the user 112 (e.g., by providing a web page 506 faster); and/or may expand the scalability of the content provider 408 (e.g., enabling a set of content provider servers 410 to fulfill a larger base of content requests 418).

As a second technical effect, automated techniques may result in higher-quality comparison polls 504 than techniques depending upon an author 502. As a first such example, even in scenarios where it is feasible to depend upon authors 502 or other users 112 to generate comparison polls 504, an automated generation of comparison polls 504 may result in higher consistency among the comparison polls 504 presented with the content items 406. For example, different authors 502 may create comparison polls 504 in a different manner, or with varying degrees of interest (e.g., a first comparison poll 504 may pose an interesting question, while a second comparison poll 504 may have an obvious answer). An automated technique for generating comparison polls 504 may generate an entire set of comparison polls 504 in a consistent manner that promotes the coherence of the content provided by the content provider 408. As a second such example, an automated poll generator may evaluate the magnitude of user engagement of users 112 with various types of comparison polls 504 (e.g., the percentage of comparison responses 508 received for each type of comparison 604). For example, some poll questions 614 may be clear and interesting, while other comparison questions 614 may be ambiguous or not interesting. An automated poll generator may track such user engagement, and may adjust the automated poll generation to generate more comparison polls 504 based on comparisons 604 that elicit a high percentage rate, and fewer comparison polls 504 based on comparisons 604 that elicit a low percentage rate. These and other technical effects maybe achievable through the configuration of the client device 110 and/or the content provider 410 to implement the techniques presented herein.

4. Example Embodiments

Figure 7:
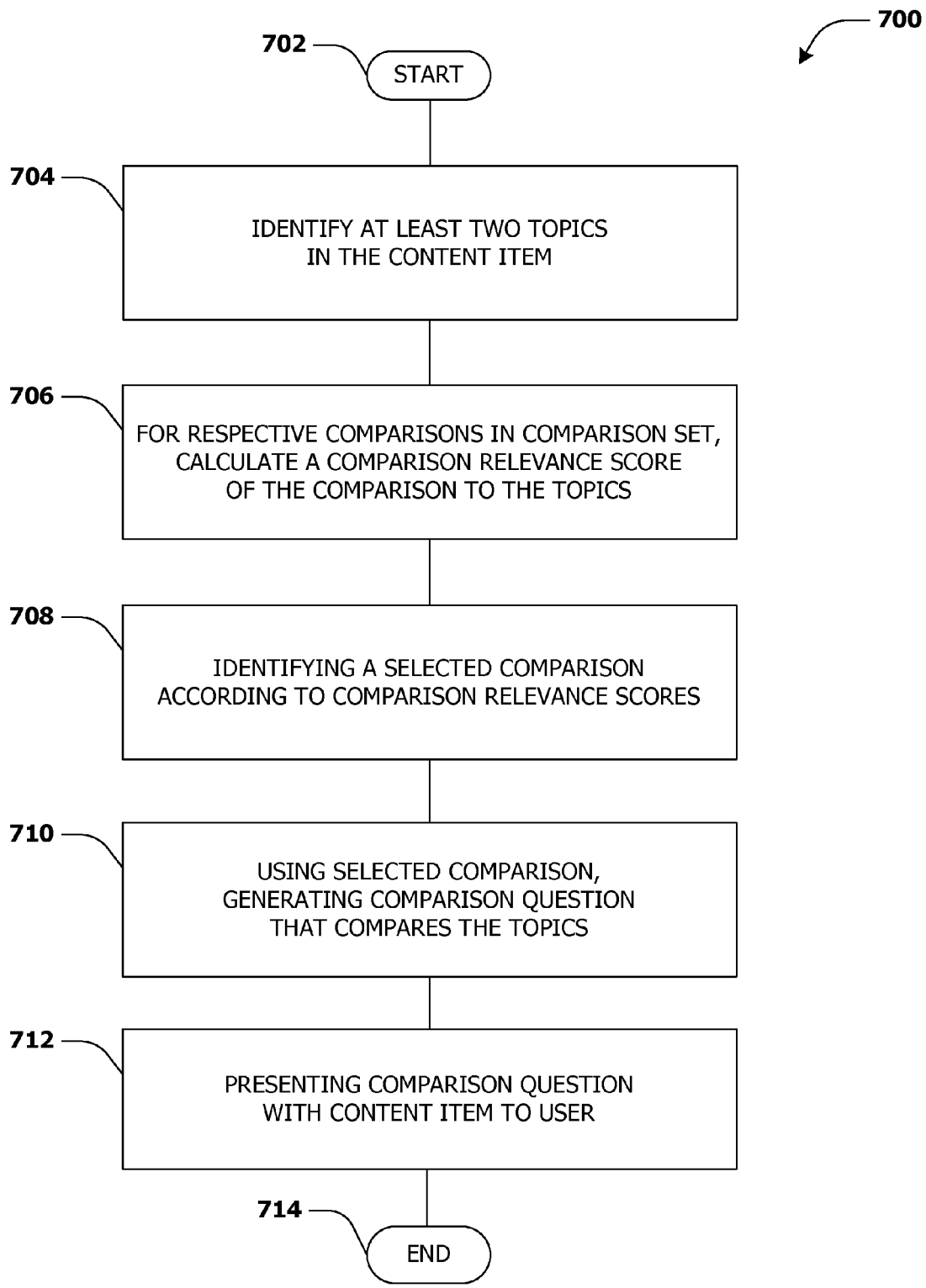
FIG. 7 is an illustration of a scenario featuring an example method of presenting content to a user in accordance with the techniques presented herein.

FIG. 7 presents an illustration of a first example embodiment of the techniques presented herein, illustrated as an example method 700 of presenting a content item 406 to a user 112. The example method 700 may be implemented, e.g., as instructions stored in a memory (e.g., a hard disk drive, a solid-state storage device such as a flash memory device, or a magnetic or optical disc) that, when executed on a processor 210 of a computer such as a client device 112 and/or a server 104, cause the computer to operate according to at least a portion of the techniques presented herein.

The example method 700 begins at 702 and comprises identifying 704 at least two topics 608 in the content item 406. The example method 700 also involves, for respective comparisons 604 in a comparison set 602, calculating 706 a comparison relevance score 610 of the comparison 604 to the topics 608 of the content item 406. The example method 700 also involves identifying 708 a selected comparison 612 according to the comparison relevance scores 610. The example method 700 also involves, using the selected comparison 612, generating 710 a comparison question 614 that compares the topics 608 of the content item 406. The example method 700 also involves presenting 712 the comparison question 614 with the content item 406 to the user 112. In this manner, the example method 700 achieves the presentation of the content item 406 to the user 112 with an automatically generated comparison poll 504 in accordance with the techniques presented herein, and so ends at 714.

Figure 8:
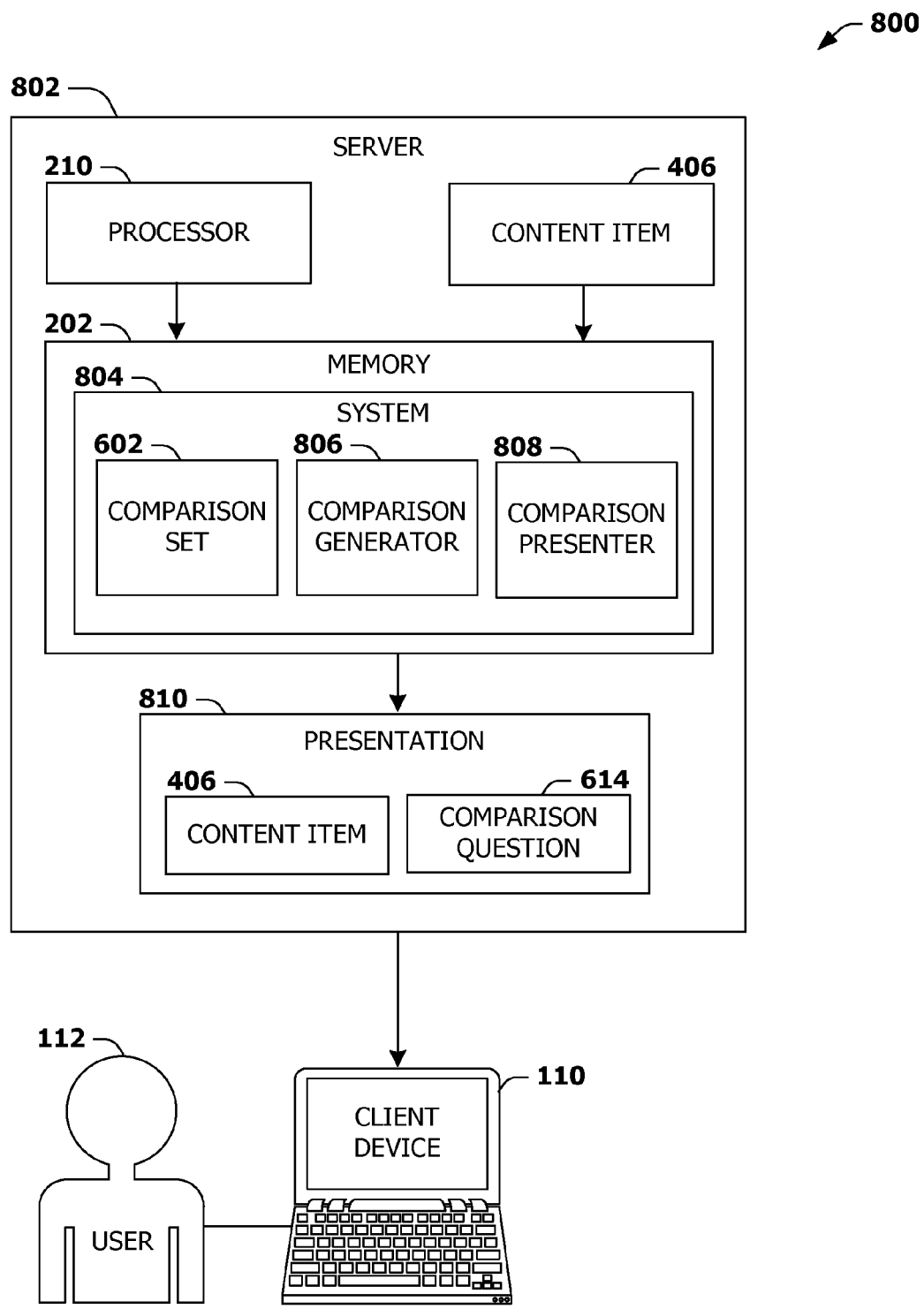
FIG. 8 is an illustration of a scenario featuring an example server that presents content to a user in accordance with the techniques presented herein.

FIG. 8 presents an illustration of a scenario 800 involving a second example embodiment of the techniques presented herein, comprising a server 802 that provides a content item 406 to a user 112. The server 802 may comprise a processor 210 and a memory 202 (e.g., a hard disk drive, a solid-state storage device such as a flash memory device, or a magnetic or optical disc) storing instructions that provide an example system 804, e.g., as a set of components that interoperate according to the techniques presented herein in order to cause the server 802 to present a content item 406 to a user 112 of a client device 110.

In particular, the example system 804 comprises a comparison set 602, comprising a set of comparisons 604 applicable to at least two topics 608. The example system 804 also comprises a comparison generator 806 that, for a content item 406 to be presented to a user 112 identifies at least two topics 608 in the content item 406; for respective comparisons 604 in the comparison set 602, calculates a comparison relevance score 610 of the comparison 604 to the topics 608 of the content item 406; and identifies a selected comparison 612 according to the comparison relevance scores 610. The comparison generator 808 also uses the selected comparison 610 to generate a comparison question 614 that compares the topics 608 of the content item 406. The example system 804 also comprises a comparison presenter 80 that presents the comparison question 614 with the content item 406 to the user 112 (e.g., in a generated presentation 810, such as a web page, provided by the server 802 to the client device 110 for rendering and presentation to the user 112). In this manner, the server 802 in the scenario 800 of FIG. 8 presents the content item 406 to the user 112 in accordance with the techniques presented herein.

Figure 9:
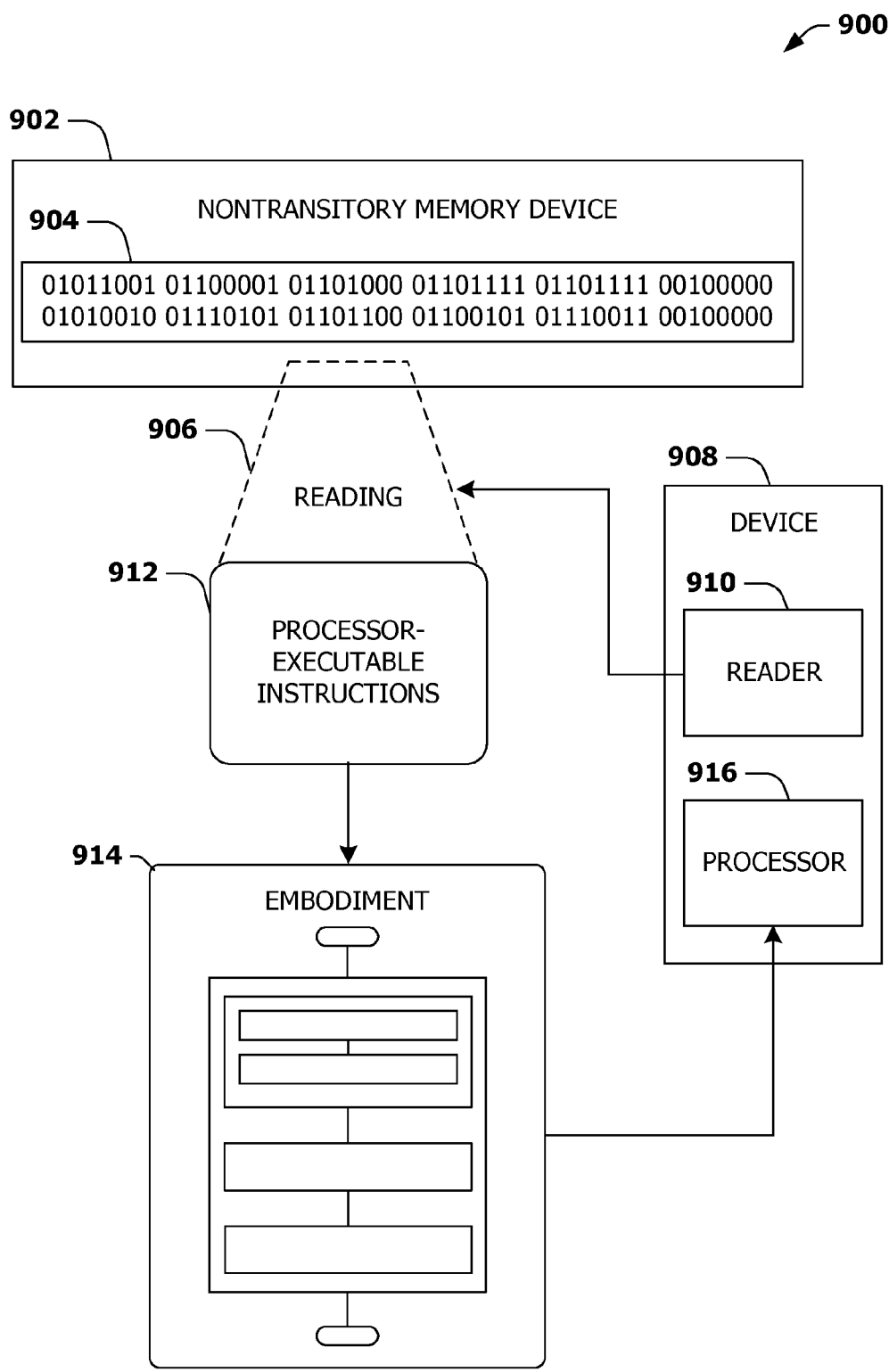
FIG. 9 is an illustration of a scenario featuring an example nontransitory memory device that causes a device to present content to a user in accordance with the techniques presented herein.

FIG. 9 is an illustration of a scenario 900 involving a third example embodiment of the techniques presented herein, comprising an example nontransitory memory device 902, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 901 of a device 908 (e.g., a read head of a hard disk drive, or a read operation invoked on a solid-state storage device), express processor-executable instructions 912.

The execution of the processor-executable instructions 912 on the processor 916 causes the device 908 to present a content item 406 to a user 112. In particular, the processor-executable instructions 912 cause the device 908 to identify 704 at least two topics 608 in the content item 406. The processor-executable instructions 912 also cause the device 908 to, for respective comparisons 604 in a comparison set 602, calculate 706 a comparison relevance score 610 of the comparison 604 to the topics 608 of the content item 406. The processor-executable instructions 912 also cause the device 908 to identify 708 a selected comparison 612 according to the comparison relevance scores 610. The processor-executable instructions 912 also cause the device 908 to, using the selected comparison 612, generate 710 a comparison question 614 that compares the topics 608 of the content item 406. The processor-executable instructions 912 also cause the device 908 to present 712 the comparison question 614 with the content item 406 to the user 112. In this manner, the example nontransitory memory device 902 causes the device 908 to present the content item 406 to the user 112 in accordance with the techniques presented herein.

5. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 700 of FIG. 7; the example system 804 of FIG. 8; and the example nontransitory memory device 902 of FIG. 9) to confer individual and/or synergistic advantages upon such embodiments.

5.1. Identifying Topics in Content Items

A first aspect that may vary among embodiments involves the manner of identifying the topics 608 present in a content item 406.

As a first variation of this first aspect, a particular content item 406 may be provided with topics 608 already identified as part of the metadata of the content item 406. For example, the author 502 of the content item 406 may have tagged the content item 406 with identifiers, such as hashtags, that identify the topics 608 of the content item 406.

As a second variation of this first aspect, a content item 406 may describe the at least two topics 608 in a language, and the topics 608 in the content item may be identified by evaluating the content item according to a language cue set of the language, and identifying the respective topics 608 in the content item 406 according to the language cue set. As a first such example, proper names in many languages are identified using capitalization, while in other languages, such as traditional Chinese, proper names are designated by a distinctive mark. As a second such example, a lexical parsing technique may be applied to a written document to identify keywords that appear in significant locations, such as in the title of the content item 608 or in the subject position of a structured sentence.

As a third variation of this first aspect, the topics 608 of a content item 406 may be identified by analyzing the context and content of the content item 406, such as keyword frequency and the semantic relationships among topics 608 in the content item 406. As a second such example, a content item 406 comprising a media item may include associations of respective topics 608 with a topic identifier, such as a distinctive voiceprint in a voice recording of a speaker; a distinctive biometric of an individual depicted in a visual medium; or a distinctive visual characteristic of an object that may be recognized by a machine vision system. In such scenarios, the topics 608 may be identified by applying a recognizer to the content item that identifies the topic identifiers of the respective topics 608.

Figure 10:
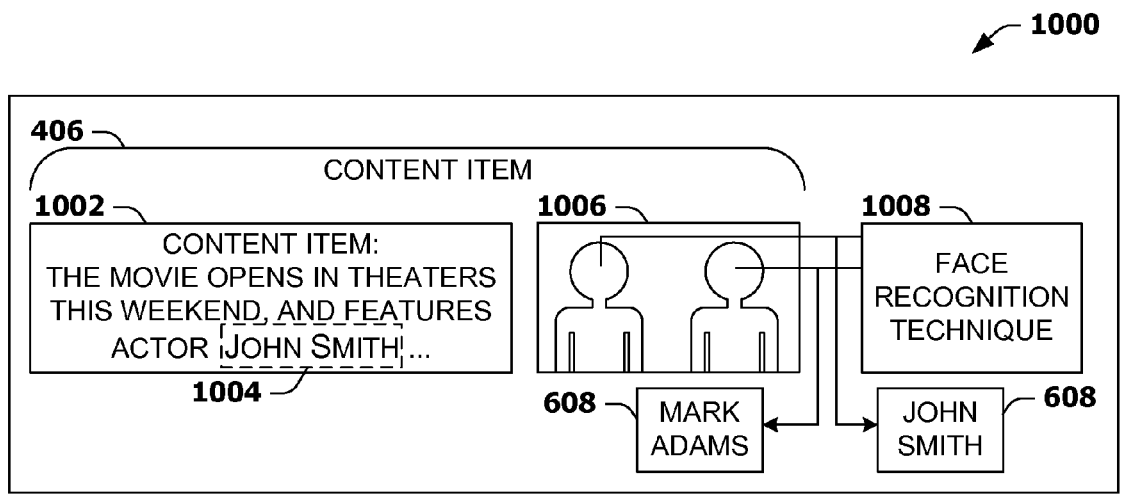
FIG. 10 is an illustration of an example scenario featuring an evaluation of content items to identify related topics in accordance with the techniques presented herein.

FIG. 10 presents an illustration of an example scenario 1000 featuring these variations in the recognition of topics 608 in a content item 406. In this example scenario 1000, the content item 406 comprises a text article 1002 about a movie featuring a pair of actors, and a photo 1006 of the actors on the set of the movie. The text article 1002 may be evaluated by a lexical parsing technique to identify a language cue 1004 identifying a first actor, such as the capitalization of the actor's name in the written article. The photo 1004 may also be evaluated by a face recognition technique 1008, which may determine that the photo 1006 accompanying the written article 1002 includes the faces of each actor. The evaluation of the content item 406 may therefore determine that the content item 406 pertains in some manner to this pair of actors, and may generate a comparison poll 504 involving a comparison of these two topics 608.

As a fourth variation of this first aspect, the identification of topics 608 of a content item 406 may involve a machine learning technique. Many machine learning techniques may be developed and applied to content items 406 to recognize the topics 608 associated therewith, including artificial neural networks; genetically generated algorithms; Bayesian statistical classifiers; decision trees; and expert systems. As one such example, for the respective training comparisons 604 of a training comparison set, a comparison relevance score 610 may be calculated, and a classifier may be trained to generate the comparison relevance score 610 of the respective training comparisons 604. Calculating the comparison relevance scores 610 in view of a particular content item 406 may thereafter be achieved by invoking the classifier to calculate the comparison relevance score 610 of the comparison 610 to the at least two topics 604.

Figure 11:
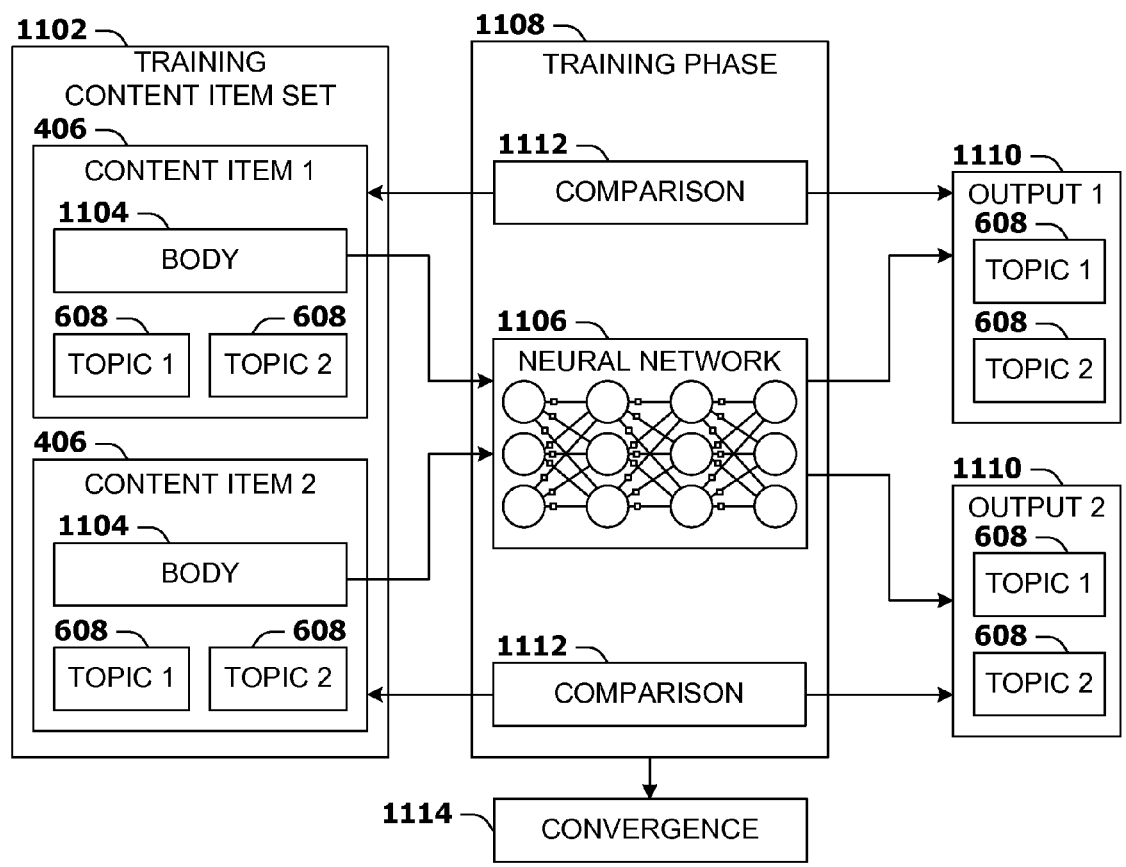
FIG. 11 is an illustration of an example scenario featuring identification of topics in content items utilizing machine learning in accordance with the techniques presented herein.

FIG. 11 presents an illustration of an example scenario 1100 featuring one such machine learning technique that may be applied to identify the topics 608 of a content item 406. In this example scenario 1100, an artificial neural network 1106 is provided, comprising a set of nodes connected in layers by synapses respectively having a weight. A guided training phase 1108 is first performed, wherein the weights of the synapses are initialized to zero or randomized, and a training content item set 1102 is provided, featuring a set of content items 406 for which the associated topics 608 have already been accurately identified (e.g., by the authors 502 of the content items 406). The body 1104 of each content item 406 in the training content item set 1102 may be provided to the artificial neural network 1106, which generates outputs 1110 of the probability that the content item 406 pertains to a particular type of topic 608. A comparison 1112 of the output 1110 of the artificial neural network 1106 with the topics 608 identified for the content item 608 reveals the proficiency of the artificial neural network 1106 in correctly evaluating the content item 406 identifying such topics 608, and the weights of the synapses are incrementally adjusted to achieve a more accurate recognition by the artificial neural network 1106. The guided training phase 1108 continues as an incremental, iterative adjustment over the training content item set 1102, until the artificial neural network 1106 reaches a convergence 1114, wherein the comparisons 1112 with the content items 406 of the training content item set 1102 are within a desired degree of accuracy. An artificial neural network 1106 trained in this matter may then be applied to content items 406 for which the topics 608 have not yet been identified, and the output 1110 may be construed as valid output. During use, retraining of the artificial neural network 1106 may be periodically and/or continuously performed in order to maintain and sharpen the accuracy of the artificial neural network 1106 in recognizing the topics 608 of the content items 406. Many such techniques may be utilized to recognize the topics 608 of the content items 406 in embodiments of the techniques presented herein.

5.2. Calculating Comparison Relevance

A second aspect that may vary among embodiments involves the manner of identifying a selected comparison 612 of a comparison set 602 for application in generating the comparison question 614 for the topics 608 of the content item 406.

As a first variation of this second aspect, the process of evaluating the comparisons 612 may be achieved in a variety of ways. As a first such example, the evaluation may be performed as a consecutive evaluation of each comparison 612, and/or concurrent evaluation of comparisons 612 to identify the selected comparison 612. As a second such example, a series of calculations may be involved in each comparison 612, and the series of calculations may be wholly for a first comparison 612 before being performed for a second comparison 612, and/or may be partially performed for a first comparison 612 and then partially performed for a second comparison 612 before being completed for the first comparison 612. The latter approach may enable an earlier discarding of comparisons 612 from evaluation for which the initial stages of the evaluation indicate a likelihood of a low comparison relevance score.

As a second variation of this second aspect, respective comparisons 604 may be associated with a topic type, such as comparisons 604 among people, places, media types such as films and television shows, and products such as mobile phones and cameras. Comparison relevance scores 610 may be calculated by comparing the topic types of the topics 608 of the content item 406 with the topic type of the comparison 604; e.g., an article about film actors, and featuring the names of film actors, may result in a high comparison relevance score 610 with a first comparison 604 specifically involving film actors (e.g., "which actor is better in action films?"), a modestly high comparison relevance score 610 with a second comparison 604 involving stage actors (e.g., "which actor would be better as Shakespeare's Hamlet?"), and a low comparison relevance score 610 with a third comparison 604 involving singers (e.g., "which person has a better singing voice?") A comparison 604 having a closely matching topic type may then be selected to compare the topics 406 of the content item 608.

As a further example of this second variation of this second aspect, the respective topics 608 of the content item 406 may have a comparison magnitude for the topic type. For example, for a written article that involves two actors, a first actor may be known to appear predominantly in action films, while a second actor may also appear in a few action films, but may more frequently appear in comedy films. While the pair of actors may have a high comparison relevance score 610 with a first comparison 604 generally involving film actors (e.g., "which actor do you like more?"), a second comparison 604 particularly involving action films may have a high comparison relevance score 610, but only a moderate comparison relevance score 610 with the second actor.

As a third variation of this second aspect, the content item 406 may be associated with a context, such as the setting, tone, opinion, source, or target audience of the content item 406. The comparison relevance scores 610 of respective comparisons 604 may be compared with the context of the content item 406 in order to select a comparison 604 matching the context of the content item 406.

As a fourth variation of this second aspect, the calculation of the comparison relevance score 610 may involve various statistical and computational techniques, including machine learning techniques (such as illustrated in the example scenario 1100 of FIG. 11), keyword matching, and feedback from previously detected user engagement of users 112 with the topics 608 and/or with the comparison 604 presented in the same or different contexts. As a first such example, in an unsupervised training model, a corpus of text messages may be evaluated to detect various linguistic patterns that may be indicative of topics 608 (e.g., frequently referenced proper nouns) and comparisons 602 (e.g., frequently-occurring phrases that are frequently used to connect particular pairs of topics 608). As a second such example, in a supervised training model, for the respective training comparisons 604 of a training comparison set 1102, a comparison relevance score 610 may be calculated, and a classifier may be trained to generate the comparison relevance scores 610 of the respective training comparisons 604. The comparison relevance score of a particular comparison 604 to a particular set of topics 608 may be achieved by invoking the classifier to calculate the comparison relevance score 610 of the comparison 604 to the respective topics 608.

As a fifth variation of this second aspect, the comparisons 604 may be filtered according to a targeting metric, e.g., in order to ensure that only comparisons 604 that are particularly well-suited to a content item 406 are presented. Presenting comparison polls 504 that are poorly suited to the content item 406 may diminish user engagement with the comparison poll 504, and possibly with future comparison polls 504 for other content items 406 and even engagement with the content provider 408 as a whole. Accordingly, for the respective comparisons 612, a comparison magnitude may be calculated, e.g., as a magnitude or confidence of the match between each comparison 612 and the content item 406. For example, for a content item 406 about the process of learning acting skills and that mentions two actors, a first comparison 612 that asks about the acting capabilities of the actors may be identified as having higher relevance than a second comparison 612 asking which actor would win in a race.

As a sixth variation of this second aspect, the respective comparisons 612 may be evaluated according to the relevance of the comparison 612 to the topics 608. Accordingly, for the respective comparisons 612, the comparison magnitude may be calculated as a magnitude or confidence of the match between each comparison 612 and each topic 608. A particular comparison 604 may be identified as the selected comparison 612 only if a comparison magnitude of the comparison 604 with each topic 608 is above a comparison magnitude threshold (e.g., refraining from selecting a comparison 604 that has an insufficient comparison magnitude with one of the topics). As a second such example, if no comparison 612 is identified as having a comparison relevance score 610 above a particular topic relevance threshold (e.g., if no comparison 604 closely fits the sets of topics 608 of a content item 406), an embodiment of these techniques may refrain from presenting a comparison poll 504 with the content item 406.

As a seventh variation of this second aspect, the respective comparisons 612 may be evaluated with respect to other comparisons 612 of the comparison set 602. For example, it may be desirable to diversify the selection of the comparisons 612 of the comparison set 602 among the content items 406 and/or topics 608. If a particular comparison 612 is generically applicable to a wide variety of topics 608 (e.g., "which of these individuals is more attractive?"), an automated evaluation might ubiquitously choose the comparison 612 over other comparisons 612 that are more selective (e.g., "which of these individuals is a better actor?") It may therefore be desirable to promote the election of the more selective comparison 612 over the generic comparison 612 when applicable, even if other factors of the comparisons 612 are equivalent or even favor the generic comparison. Accordingly, for a particular content item 406 and/or set of topics 608, each comparison 612 may be evaluated with respect to other comparisons 612 of the comparison set 602, e.g., in order to balance the frequency of selection of the comparisons 612.

Figure 12:
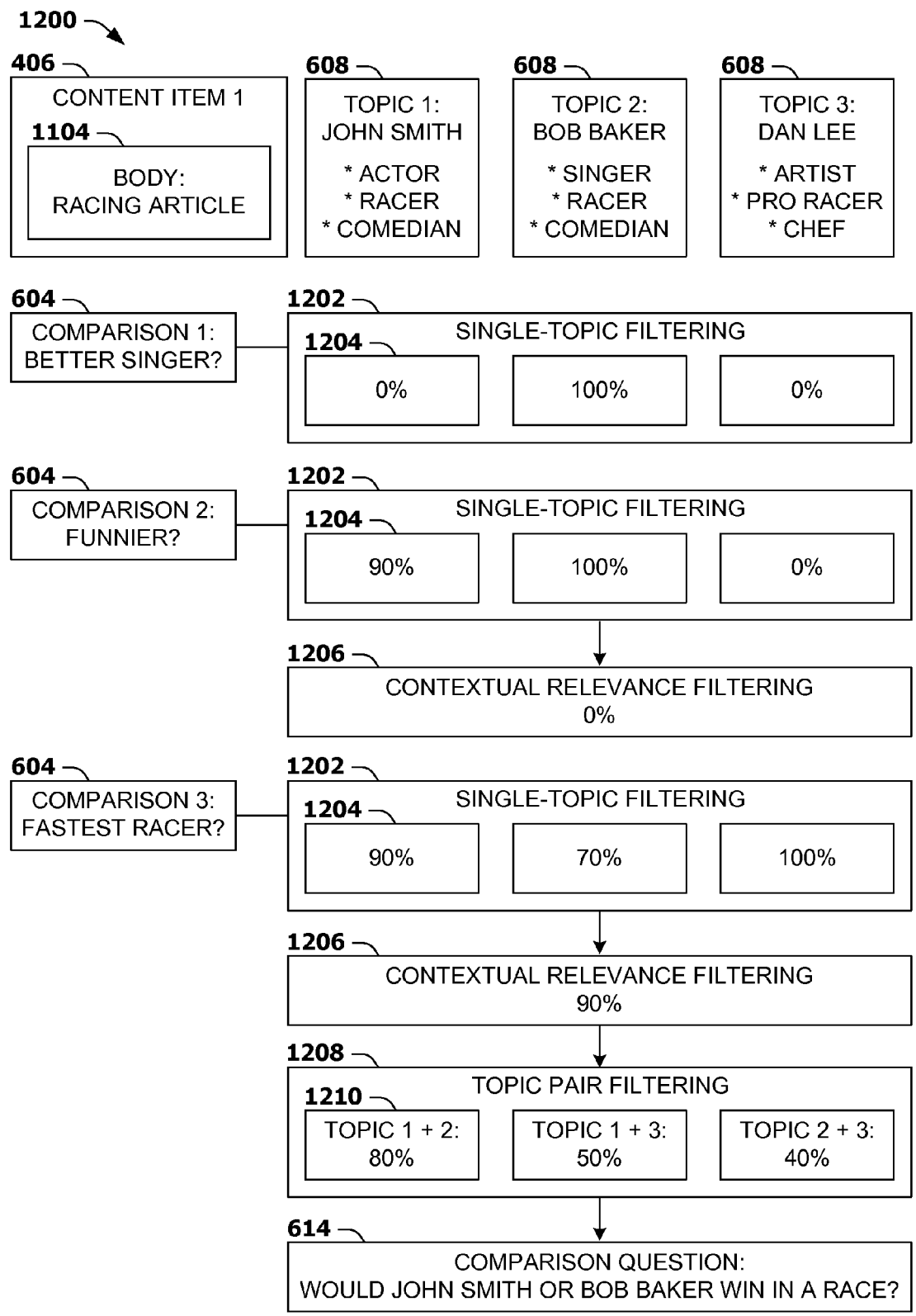
FIG. 12 is an illustration of an example scenario featuring an example calculation of comparison relevance scores for respective topics in accordance with the techniques presented herein.

FIG. 12 presents an illustration of an example scenario 1200 featuring a calculation of comparison relevance scores 610 in order to identify a selected comparison 612. In this example scenario 1200, a content item 406 includes an article about racing, and may specifically discuss, as topics 608 of the article, three individuals who have varying degrees of publicly recognized interests in racing. Among a comparison set 602, a first comparison 604 may be evaluated that compares the singing capabilities of the respective topics 608. A single-topic filtering technique 1202 may first be applied to determine whether at least two topics 608 of the content item 406 are associated with the comparison 604, and a calculation of single topic filtering scores 1204 indicating that only one topic 608 is associated with the comparison 604 may result in a discarding of the comparison 604 for this content item 406.

A second comparison 604 may also be evaluated that compares the comedic talents of the topics 608 of the content item 406. A single-topic filtering technique 1202 may compare each topic 608 with the comparison 604, and may determine that two such topics 608 are associated with the comparison 604. However, a contextual relevance filtering 1206, involving the relevance of the comparison 604 with the context of the content item 406, may indicate no such contextual relevance (e.g., the article may not mention anything about the comedic talents of any of the individuals). That is, while the comparison 604 may pertain closely to the individual identified in the article, the article itself may have no connection with the comparison 604, and presenting a comparison question 614 based on the comparison 604 may appear as non sequitur if presented with the content item 406. Accordingly, the second comparison 604 may be discarded due to insufficient contextual relevance with the content item 406.

A third comparison 604 may also be evaluated that compares the racing capabilities of the respective topics 608. A single-topic filtering technique 1202 may reveal that all three topics 608 have a publicly recognized interest in racing, and a contextual relevance filtering 1206 may indicate a high contextual relevance of the comparison 604 with the content item 406, which is primarily about racing. A topic pair filtering 1208 may then be applied to determine the fairness of the comparisons among respective pairs of topics 608. For example, the first two individuals may be publicly recognized as amateur racers, but the third individual may be recognized as a world-class professional racer, such that a comparison 604 of the third individual with either of the first two individuals does not present an interesting or accepted comparison. However, the first two individuals may be recognized as having similar proficiency in the topic of the comparison 604, and therefore the topic pair filtering may identify the pair of topics 608 involving the first individual and the second individual as having a high topic pair score 1210. The third comparison 604 may therefore be identified as the selected comparison 612, and a comparison question 614 may be generated and presented using the selected comparison 612 and the first two topics 608. Many such techniques may be used to calculate the comparison relevance scores 610 and to identify the selected comparison 612 in accordance with the techniques presented herein.

5.3. Generating Comparison Set

A third aspect that may vary among embodiments of the techniques presented herein involves the manner of generating the comparison set 602.

As a first variation of this third aspect, the comparisons 604 of a comparison set 602 may be generated by one or more authors 502, e.g., as a base of comparisons 604 that might apply to the topics 608 in a set of content items 406. Moreover, if one or more content items 406 features topics 608 for which a comparison 604 is not identified with a desired confidence, an author 502 may be notified, and requested to generate a new comparison 604 for the content item 406. The new comparison 604, once received from the author 502, may then be added to the comparison set 602.

As a second variation of this third aspect, one or more comparison templates may be provided, where each comparison template specifies how a comparison question 614 is generated to present a comparison 604 among the topics 608 of a content item 406. A comparison template set, comprising one or more comparison templates, may be generated for comparing similar topics 608. The comparisons 604 of the comparison set 602 may then be compared with the topics 608 of a content item 406 by identifying a selected comparison template, among the comparison templates, according to the comparison relevance scores of the comparisons 604, and the comparison question 614 may be generated according to the comparison template.

As a third variation of this third aspect, a machine learning technique may be utilized to develop and apply the content training set. For example, a training content item set may be provided that comprises at least one training content item, and a machine learning technique may be provided to examine the training content item to identify a training comparison question and to, generate a comparison template. The output of the machine learning technique may be compared with pre-identified comparison templates generated therefrom in order to refine the training of the machine learning technique, and once trained to convergence 1114, an adequately trained machine learning technique may extract comparison templates from a larger corpus of source content items.

As a fourth variation of this third aspect, the comparison templates of the comparison template set may be derived from a set of existing content items 406 authored by various authors 502. For example, from a corpus of text message authored in a language, a comparison question template may be identified in a text message of the language. In one such embodiment, a machine learning technique may be utilized to identify comparison question templates from the text messages, and to add a corresponding comparison template to the comparison template set. The comparison question template comprises at least two slots into which respective topics 608 may be inserted to generate a content question 614. The corpus of text messages may be derived from a variety of sources, including a public fact or opinion database, a social network, and a forum or multi-user chat session. The existing content items 406 may also inform other aspects of the techniques presented herein, such as single-topic filtering (e.g., determining the comparison magnitude of a topic 608 with a comparison 602 according to the frequency with which the topic 608 and the comparison 602 are mentioned together in public comments) and topic pair filtering (e.g., determining whether two topics 608 are comparable based on the frequency with which such topics 608 are mentioned together in public comments).

Figure 13:
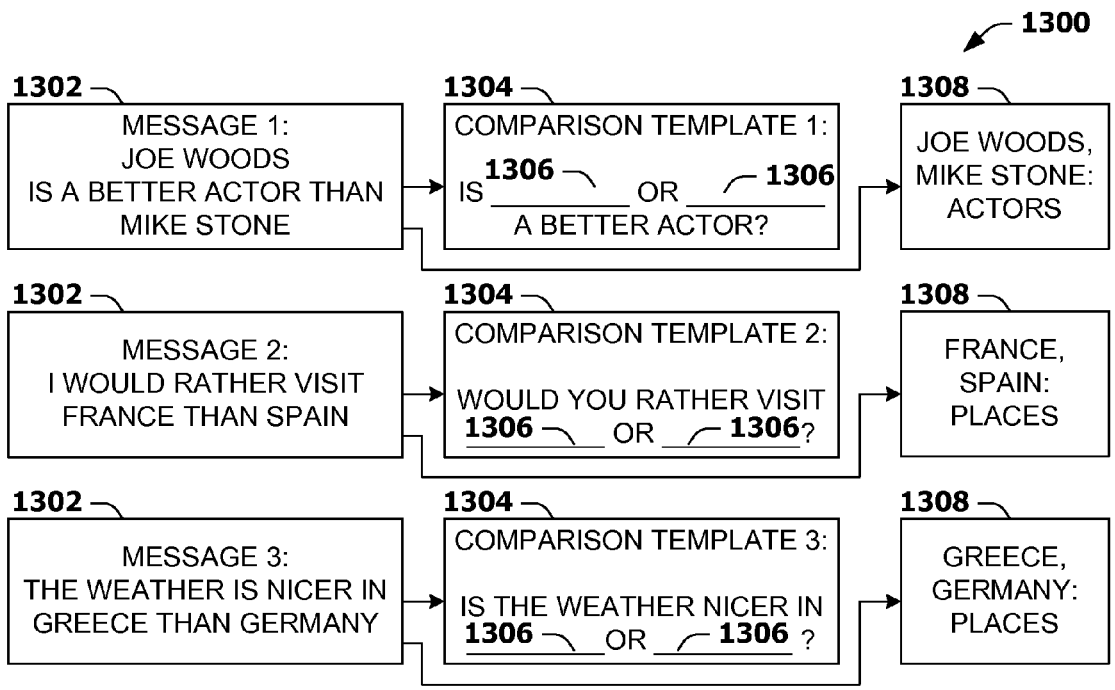
FIG. 13 is an illustration of an example scenario featuring an extraction of archetype comparison questions from a set of messages in accordance with the techniques presented herein.

FIG. 13 presents an illustration of an example scenario 1300 featuring one such technique for generating a set of comparison templates 1304. In this example scenario 1300, a set of source messages 1302 authored by users 112 on various topics are provided, and are evaluated to identify the inclusion of a comparison template involving a comparative opinion ("Joe Woods is a better actor than Mike Stone," or "I would rather visit Germany than Spain"). The opinions in such source messages 1302 may dissected into the topics 608 of the specific opinion from the comparison, and the latter may be used to generate a comparison template 1304 with the language reformatted as a question (e.g., "[Individual A] is a better actor than [Individual B]" is revised to "Is [Slot 1] a better actor than [Slot 2]?", and "I would rather visit [Place A] than [Place B]" is revised to "Would you rather visit [Slot 1] or [Slot 2]?") Additionally, the topics 608 of the source messages 1302 may be evaluated to determine a topic type of the topics 608 of the comparison template 1304 (e.g., whether the opinion is a comparison of a particular type of individual, such as an actor), and/or the context of the source message 1302 (e.g., whether the comparison pertains to a particular property of the topics 608, such as the relative pleasantness of the weather or the relative desirability of visiting various places). Many such ways may be devised to generate a comparison template set for use in generating the comparison questions 614 for the topics 608 of a particular content item 406 in accordance with the techniques presented herein.

5.4. Collecting and Presenting Responses

A fourth aspect that may vary among embodiments of the techniques presented herein relates to the collection and use of users' comparison responses 508 to the presentation of a comparison question 614 as part of a comparison poll 504.

As a first variation of this fourth aspect, a content provider server 410 may simply accept users' comparison responses 508 and present the comparison responses 508, e.g., as a comment thread, or as a gauge of user reaction to a particular content item 406.

As a second variation of this fourth aspect, a content provider server 410 may notify the user 112 responding to a comparison question 614 of the responses collected from all such users 112 to the comparison question 614. For example, upon receiving a comparison response 508 from a first user 112, the content provider server 410 may store the comparison response 508 in a comparison response set for the comparison question 614; upon presenting the comparison question to a second user 112, the content provider server 410 may also present the comparison response set for the comparison question 614 to the second user 112.

As a third variation of this third aspect, a content provider server 410 may, for respective comparisons 604 of the comparison set 602, the content provider server 410 may rank the topics 608 for the comparison 604 according to the comparison responses 508, and present a rank list of the topics 608 for the comparison 604. For example, the content provider server 410 may present the comparison 604 "which is the better actor: . . . " for a variety of actor pairs, may tabulate the comparison responses 508 for all such actors, and may generate a ranked list of top-ranking actors who are frequently selected over another actor in the comparison responses 508. As a further such variation, the tabulation of comparison responses 508 may enable the content provider 408 to generate comparison polls 504 of consistently high interest, e.g., by choosing to comparisons of topics 604 on which users' comparison responses 508 are predicted to be evenly divided.

As a fourth variation of this third aspect, a content provider server 410 may use the comparison response 508 of a user 112 to further serve the user 112. As a first such example, if the user 112 appears to enjoy answering comparison polls 504 on a particular set of topics 608, such as favorite actors, the content provider server 410 may generate and present additional comparison polls 504 involving similar topics 608, such as other actors. As a second such example, a user profile of the user 112 may be updated based on the user's comparison responses 508, which may be used, e.g., to target recommendations and advertisements of media and products based on the user's interests.

Figure 14:
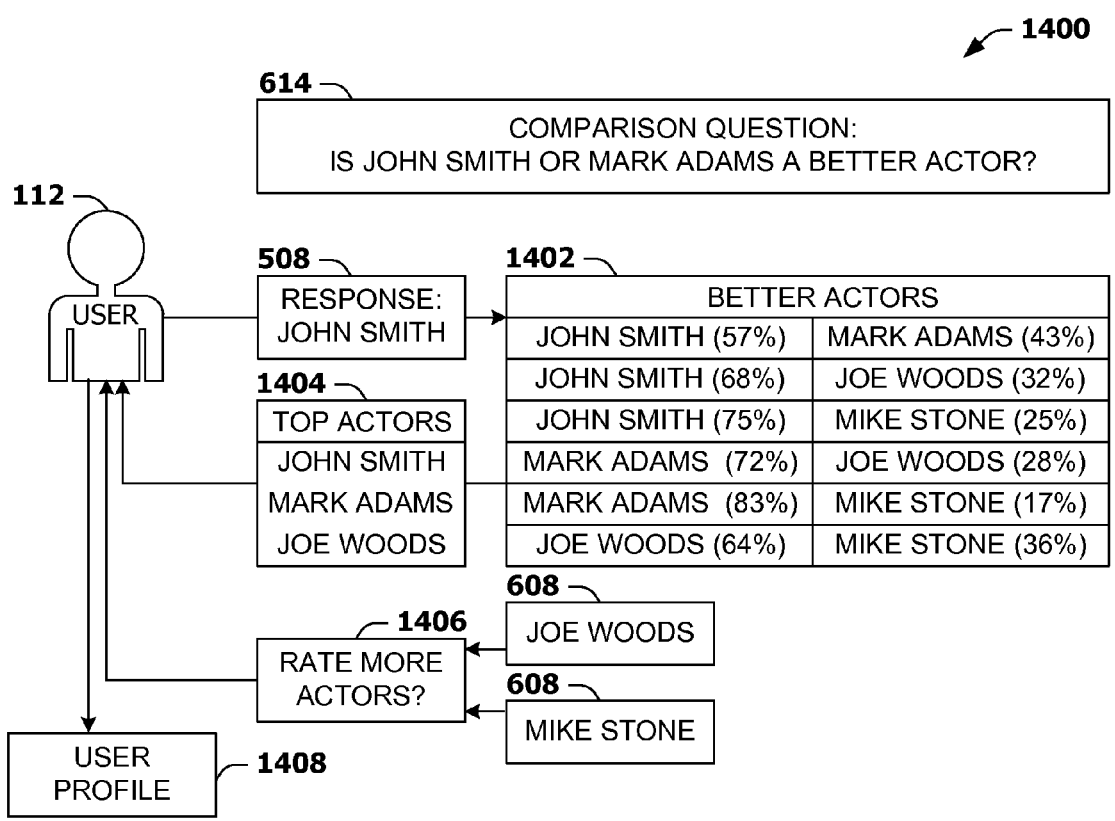
FIG. 14 is an illustration of an example scenario featuring various uses of comparison responses to a comparison question in accordance with the techniques presented herein.

FIG. 14 presents an illustration of an example scenario 1400 featuring many such uses of comparison responses 508 of a user 112 to a comparison question 614. In this example scenario 1400, when the user 112 submits a comparison response 508 to a comparison question 614 about the user's preferences in actors, the user's comparison response 508 may be added to a tabular record 1402 of user responses 508 among all such users 112, and may be presented to the user 112, e.g., as a "top actors" list 1404. As a second such example, upon submitting a comparison response 508 to the comparison question 614, the user 112 may be prompted to answer the same comparison question 614 for other pairs of topics 608, such as other actors. As a third such example, the user response 508 of the user 112 may be used to update a user profile 1408 of the user 112, such as a record of the user's interests. Many such uses of the comparison responses 508 of users 112 may be included in variations of the techniques presented herein.

6. Usage of Terms

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. A method of supplementing a presentation of a content item to a user, comprising:
    identifying at least two topics in the content item;
    for a first comparison in a comparison set, calculating a first comparison relevance score of the first comparison to the at least two topics;
    for a second comparison in the comparison set, calculating a second comparison relevance score of the second comparison to the at least two topics;
    based upon the first comparison relevance score and the second comparison relevance score, identifying the first comparison as a selected comparison;
    using the selected comparison, generating, using a processor, a comparison question that compares the at least two topics by inserting a first topic of the at least two topics into a first slot of a comparison question template of the selected comparison and inserting a second topic of the at least two topics into a second slot of the comparison question template; and
    presenting the comparison question with the content item to the user.

2. The method of claim 1, wherein:
the content item describes the at least two topics in a language; and
identifying the at least two topics in the content item further comprises:
evaluating the content item according to a language cue set of the language; and
identifying the respective topics in the content item according to the language cue set.

3. The method of claim 1, wherein:
the content item comprises a media item;
the respective topics are associated with a topic identifier; and
identifying the respective topics in the content item further comprises: identifying, within the media item, the topic identifier of the topic.

4. The method of claim 1, wherein identifying the first comparison as the selected comparison further comprises:
for respective comparisons of the comparison set:
for the respective topics, determine a topic relevance of the topic to the comparison; and
upon determining that the topic relevance of at least one topic is below a topic relevance threshold, refrain from identifying the comparison as the selected comparison.

5. The method of claim 1, wherein identifying the first comparison as the selected comparison further comprises:
for the respective topics, determine a topic type of the topic; and
identifying a selected comparison according to comparison relevance scores among at least two topics with a matching topic type.

6. The method of claim 5, wherein:
the respective topics have a comparison magnitude for the topic type; and
identifying the first comparison as the selected comparison further comprises:
identifying the first comparison as the selected comparison according to the comparison relevance scores among at least two topics having a comparison magnitude above a comparison magnitude threshold.

7. The method of claim 1, wherein:
the content item is associated with a context; and
identifying the first comparison as the selected comparison further comprises: identifying the first comparison as the selected comparison according to comparison relevance scores and matching the context of the content item.

8. A server that presents a content item to a user, the server comprising:
a processor; and
a memory storing instructions that, when executed by the processor, provide:
a comparison generator that:
identifies at least two topics in the content item;
for a first comparison in a comparison set, calculates a first comparison relevance score of the first comparison to the at least two topics;
for a second comparison in the comparison set, calculates a second comparison relevance score of the second comparison to the at least two topics;
based upon the first comparison relevance score and the second comparison relevance score, identifies the first comparison as a selected comparison; and
using the selected comparison, generates a comparison question that compares the at least two topics by inserting a first topic of the at least two topics into a first slot of a comparison template of the selected comparison and inserting a second topic of the at least two topics into a second slot of the comparison template; and
a comparison presenter that presents the comparison question with the content item to the user.

9. The server of claim 8, wherein:
the server further comprises a comparison template set comprising at least one comparison template; and
the comparison generator further identifies the first comparison as the selected comparison by, among the comparison templates of the comparison template set, identifying a selected comparison template according to comparison relevance scores of comparisons of the comparison set.

10. The server of claim 9, wherein:
the server further comprises a training content item set comprising at least one training content item; and
the memory further stores instructions that, when executed by the processor, provide a comparison trainer that, for the respective training content items:
examines the training content item to identify a training comparison question;
using the training comparison question, generates a first comparison template; and
adds the first comparison template to the comparison template set.

11. The server of claim 10, wherein:
the comparison trainer, for the respective training content items:
identifies a selected topic in the training content item that is comparable with a third topic, and
adds the selected topic to a topic database; and
the comparison generator further identifies the at least two topics in the content item by identifying in the content item at least two topics of the topics database.

12. The server of claim 10, wherein:
the comparison trainer further evaluates the respective training content items to identify a topic set comprising at least two topics having a relation in the training content item; and
the comparison generator further identifies the at least two topics in the content item by identifying in the content item the topics of a topic set.

13. The server of claim 10, wherein:
the comparison trainer further calculates, for the respective training comparisons, a comparison relevance score;
the comparison trainer further trains a classifier to generate the comparison relevance score of the respective training comparisons; and
the comparison generator further invokes the classifier to calculate the first comparison relevance score of the first comparison to the at least two topics.

14. The server of claim 9, wherein:
the respective comparison templates comprise a comparison question template.

15. The server of claim 8, wherein:
the comparison template comprises a comparison question template.

16. A nontransitory memory device storing instructions that, when executed by a processor of a server, cause the server to supplement a presentation of a content item to a user, by:

identifying at least two topics in the content item;

for a first comparison in a comparison set, calculating a first comparison relevance score of the first comparison to the at least two topics;

for a second comparison in the comparison set, calculating a second comparison relevance score of the second comparison to the at least two topics;

based upon the first comparison relevance score and the second comparison relevance score, identifying the first comparison as a selected comparison;

using the selected comparison, generating a comparison question that compares the at least two topics by inserting a first topic of the at least two topics into a first slot of a comparison template of the selected comparison and inserting a second topic of the at least two topics into a second slot of the comparison template; and presenting the comparison question with the content item to the user.

17. The nontransitory memory device of claim 16, wherein presenting the comparison question further comprises:

upon receiving a comparison response from the user, store the comparison response in a comparison response set for the comparison question; and upon presenting the comparison question to a second user, present the comparison response set for the comparison question to the second user.

18. The nontransitory memory device of claim 16, wherein presenting the comparison question further comprises:

upon receiving a comparison response from the user, store the comparison response in a comparison response set for the first comparison;

rank the topics for the first comparison according to one or more comparison responses; and present a rank list of the topics for the first comparison.

19. The nontransitory memory device of claim 16, wherein presenting the comparison question further comprises:

upon receiving a comparison response from the user, present to the user an offer to present a second comparison question for the first comparison; and upon receiving from the user an acceptance of the offer:
generate a second comparison question presenting the first comparison between at least two other topics; and present the second comparison question to the user.

20. The nontransitory memory device of claim 16, wherein:

the user is associated with a user profile indicating a user interest of the user in respective topics; and presenting the comparison question further comprises:
upon receiving a comparison response from the user, adjust the user interest in the user profile of the user for the at least two topics.

* * * * *